United States Patent [19]

Rach et al.

[11] Patent Number: 4,758,401
[45] Date of Patent: Jul. 19, 1988

[54] METHOD FOR VULCANIZING PNEUMATIC VEHICLE TIRES

[75] Inventors: Heinz-Dieter Rach, Garbsen; Udo Frerichs, Langenhagen; Hans-Ulrich Klose, Wiedensahl; Carsten Boltze, Barsinghausen, all of Fed. Rep. of Germany

[73] Assignee: Continental Aktiengesellschaft, Hanover, Fed. Rep. of Germany

[21] Appl. No.: 798,180

[22] Filed: Nov. 14, 1985

[30] Foreign Application Priority Data

Nov. 20, 1984 [DE] Fed. Rep. of Germany ....... 3442303

[51] Int. Cl.$^4$ ..................... B29C 35/02; B29C 35/04; B29C 37/00
[52] U.S. Cl. .................................. 264/326; 264/315; 264/297.5; 425/58
[58] Field of Search ............... 264/315, 326, 501, 502, 264/297.5; 425/58, 36, 52

[56] References Cited

U.S. PATENT DOCUMENTS

| | | | |
|---|---|---|---|
| 2,713,382 | 7/1955 | Bosomworth et al. | 264/315 |
| 2,904,832 | 9/1959 | Frohlich et al. | 425/36 X |
| 2,939,175 | 6/1960 | Frohlich et al. | 425/36 X |
| 3,659,975 | 5/1972 | Leblond | 425/44 X |
| 4,236,883 | 12/1980 | Turk et al. | 425/36 X |
| 4,582,470 | 4/1986 | Sarumaru | 264/501 X |

FOREIGN PATENT DOCUMENTS 3000428 7/1981 Fed. Rep. of Germany.
3246624 6/1984 Fed. Rep. of Germany.

Primary Examiner—Jan H. Silbaugh
Assistant Examiner—Neil M. McCarthy
Attorney, Agent, or Firm—Becker & Becker, Inc.

[57] ABSTRACT

A method and apparatus for vulcanizing pneumatic vehicle tires where the tire beads, in the mounted state, are disposed on the radially inner periphery of a rim next to the essentially radially inwardly extending rim flanges. In order to obtain tires having a long service life and tire beads with a good sealing quality, it is proposed that the tire be vulcanized in essentially the proper contour for operation. Two, respectively radially segmented, bead-forming rings that have a variable diameter and can be displaced axially are provided. For the purpose of vulcanizing the sealing surfaces disposed in the interior of the tire so that these surfaces will rest on the rim in an airtight manner, the bead-forming rings are introduced, in a radially retracted state, into the interior of the tire blank, whereby at least one of the tire beads is ovally deformed. The segments of the molding rings are subsequenty extended to an annular radial diameter whereby the molding surface portions of the molding rings can be moved axially outwardly over the tire beads without deforming the latter. The molding rings are then moved axially outwardly over the tire beads and then retracted to their smallest diameter, and are locked into position, whereupon the tire blank is vulcanized in a mold.

4 Claims, 2 Drawing Sheets

METHOD FOR VULCANIZING PNEUMATIC VEHICLE TIRES

BACKGROUND OF THE INVENTION

1. Field of the Invention

The present invention relates to a method of vulcanizing pneumatic vehicle tires where the tire beads, in the mounted state, are disposed on the radially inner periphery of a rim next to the essentially radially inwardly extending rim flanges. The present invention also relates to an apparatus for carrying out this method.

2. Description of the Prior Art

The beads of known tires of this type are mounted on rim seating surfaces which are disposed on the radially inner periphery of the rim ring next to the rim flanges, which extend radially inwardly, as shown, for example, in German Offenlegungsschrift No. 30 00 428. Consequently, the seating surfaces, which provide for an airtight mounting of the tire beads on the rim, are disposed in the radially and axially outer regions of the tire beads, i.e. in the interior of the tire.

With conventional vulcanizing apparatus, externally disposed tire surfaces are shaped by metallic mold parts, against which the tire surfaces are pressed via a bellows-like bag disposed in the interior. However, with a flexible expandable bellows-like bag, it is not possible to provide the described sealing surfaces in the interior of the tire with the required smooth surface.

German Offenlegungsschrift No. 32 46 624 describes apparatus with which tires of the aforementioned general type can be vulcanized. With this apparatus, however, it is necessary to fold or displace the tire side walls and the beads laterally outwardly into a so-called trapezoidal position for vulcanization in order to avoid undercuts. As a result of vulcanization in the trapezoidal position, and the necessary pivoting of the tire side walls and the beads during mounting, considerable extension results in the outer portion of the side walls and considerable compression results in the inner portions of the side walls, as a result of which with multi-ply carcasses the inner carcass ply can be completely relieved and hence practically ineffective. Due to the necessary pivoting process, it is also nearly impossible to utilize reinforcing components, especially in the bead region. A tire vulcanized in this manner can be mounted upon a rim only under stress, whereby the structural stability during operation suffers.

An object of the present invention, for tires of the aforementioned general type, is to provide a vulcanization method with which the tire can be vulcanized in such a way that it can subsequently be mounted upon a rim without permanent stresses.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
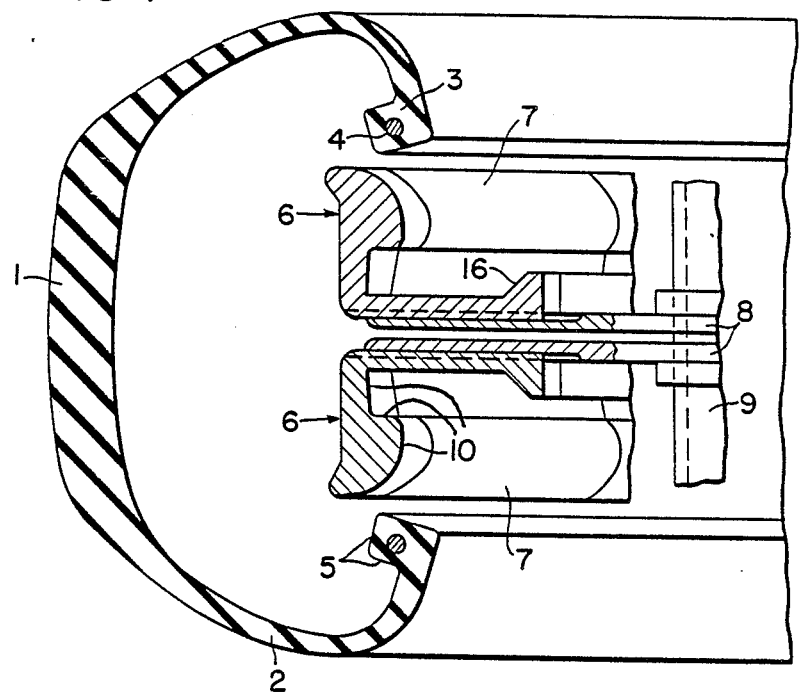
FIG. 1 is a view showing a partial radial section through a pair of molding rings that are in the axially and radially retracted state, and have already been introduced into the interior of a tire blank.

The method of the present invention is characterized primarily in that two, respectively radially segmented, bead-forming rings are provided that have a variable diameter and can be displaced axially, for the purpose of vulcanizing the sealing surfaces disposed in the interior of the tire so that these surfaces will rest on the rim in an airtight manner, the bead-forming rings are introduced, in a radially retracted state, into the interior of the tire blank; the parts of the forming rings are subsequently extended to an annular radial diameter whereby the molding surface portions of the molding rings can be moved axially outwardly over the tire beads without deforming the latter; the forming rings are subsequently retracted to their smallest diameter, and are locked into position, whereupon the tire blank is vulcanized in a vulcanizing mold so that the resulting tire essentially has the proper driving contour.

The apparatus for carrying out this method is characterized primarily by the provision of two, respectively radially segmented, bead-forming rings, with the segments thereof being radially movable to vary their diameter, and also being axially movable; the bead-forming rings are adapted to be introduced into the interior of a tire blank that is to be vulcanized; the segments of the forming rings have radially inwardly facing molding surfaces having the contour of the rim in the region of the rim flanges and seating surfaces of the latter; in the radially retracted state of the segments, the diameter of the latter also conform to the inner diameter of the rim at the rim flanges and seating surfaces thereof.

By vulcanizing the tire blank in the operating position with a preferably somewhat enlarged open width, in contrast to vulcanization in the trapezoidal position, all damaging deformations of the tire contour relative to the later operating position are avoided. Smooth sealing surfaces having the proper contour are achieved in the radially and axially outer region of the tire beads with the aid of steel rings having smooth surfaces, thus assuring that the tire beads will rest on the rim in an airtight manner when the tire is mounted.

Since the outer diameter of the molding rings is greater than the diameter of the bead core rings, it is necessary to ovally deform at least one of the tire beads when the molding rings are introduced into the tire blank. To improve this introduction still further, the side walls of the tire blank can be temporarily folded laterally outwardly. Under certain circumstances, a rolling-on apparatus or an external pressure ring (drum) can facilitate or improve the introduction and molding.

After the molding rings are located in the interior of the tire, no further deformations of the beads of the tire blank are required because due to the use of radially segmented molding rings, the molding ring segments can be moved radially and axially outwardly to such an extent that they can be introduced into the undercut spaces laterally outwardly of the tire beads without obstruction from the latter. After the molding ring segments, in this position, are again retracted to the smallest diameter of the molding rings, the molding ring segments form a molding surface that is continuous in the peripheral direction, with no interruptions between the individual segments.

By the use of only two operational inner diameters for the molding rings (1. smallest diameter: retracted state and vulcanizing position, 2. greatest diameter: extended state), a relatively simple ring-adjusting mechanism, and hence only a small amount of space, are required, so that the rings, along with the adjustment mechanism, could even be accommodated within a vulcanizing mold.

However, pursuant to a preferred embodiment of the inventive method, it is proposed to mount the molding rings in the tire blank externally of the vulcanizing mold, and thereupon to lock the molding rings in position. After the displacement mechanism, along with the adjustment mechanism, are removed, the tire blank together with the molding rings can be introduced and positioned in the open vulcanizing mold with the aid of a loading mechanism, such as a swivel are that is provided with grippers. This results in the advantage that the adjustment mechanism, which remains outside of the vulcanizing mold, does not have to be continuously heated to the vulcanizing temperature.

By using only a single pair of heating rings or molding rings that are placed into the next tire blank immediately after the vulcanization of a tire, there is achieved the advantage that the molding rings do not cool off significantly between the individual heating periods. However, it can under certain circumstances be more advantageous to use two pairs of heating rings or molding rings, because then long stopped times where the vulcanizing mold is open no longer occur between the individual heating periods.

DESCRIPTION OF PREFERRED EMBODIMENTS

Referring now to the drawings in detail, the tire blank is built up in the customary manner, so that it is provided with a tread section 1, side walls 2, and tire beads 3 in which are disposed bead cores 4. A non-illustrated carcass is anchored in the beads 3 by being looped around the bead cores 4; a pull-resistant belt can be disposed radially outwardly of the carcass.

Two bead-molding rings 6, which are preferably made of steel, serve for shaping the sealing surfaces 5 of the tire blank, with these sealing surfaces later assuring that the tire beads 3 rest in an airtight manner on a rim in the region of the radially inwardly disposed rim seating surfaces and the radially inwardly extending rim flange. The bead-molding rings 6 comprise radially movable parts 7, and are also movable in the axial direction relative to one another. Each of the bead-molding rings 6, which can, for example, comprise eight radial parts 7, is attached to a stable, partially-illustrated displacement mechanism. For radial displacement, the parts 7 can be mounted, for example, in dovetailed guides of two guide ring members 8, which in turn can be moved in the axial direction with the aid of a guide cylinder 9 or guide rods of the displacement mechanism. The radial displacement of the parts 7, and the axial displacement of the overall bead-molding rings 6, can be effected pneumatically or hydraulically with known means, such as wedges, cones, control cams, contoured members, etc. The important thing is that in the retracted state of the radial parts 7, in which the molding rings 6 assume the smallest possible diameter, the radially inwardly disposed molding surfaces 10 form a continuous surface over the entire periphery; in other words, there is no gap between the radial parts 7. In the extended state of the radial parts 7, the latter form an inner diameter of the molding rings of such a size that the parts 7 can be moved laterally outwardly without obstruction over the beads 3 and into the interior of the tire blank. By being radially retracted, the parts 7 can then be guided to the sealing surfaces 5 that are to be shaped and molded.

In the axially drawn-together state, the guide ring members 8 are either disposed next to one another, or are at least so close together that at most parts of an expandable bellows-like bag 11 are disposed between them.

The method of the present invention operates as follows.

To begin with, the bead-molding rings 6, in the radially retracted and axially drawn-together state, are introduced into the interior of a tire blank. For this purpose, it is necessary to slightly ovally deform one of the tire beads 3. The less the overall size of the molding rings 6, the less is such deformation. In order to even further simplify introduction of the molding rings 6, it can be expedient to fold the side walls 2 of the tire blank slightly laterally outwardly (FIG. 1). Under certain circumstances, it can also be expedient to individually introduce the bead-molding rings 6 one after the other into the interior of the tire blank. The displacement mechanism must then be appropriately adapted to this situation.

Figure 2:
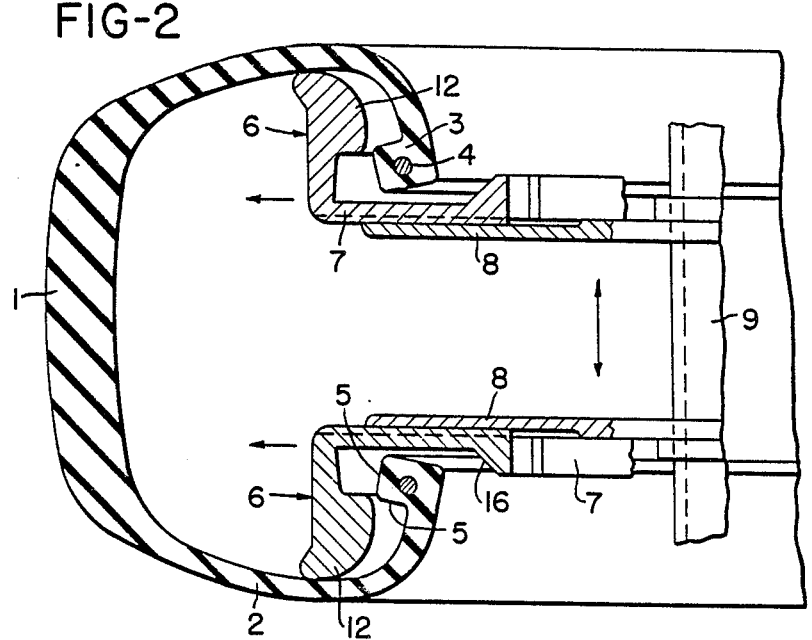
FIG. 2 is a view that shows the pair of molding rings in the radially and axially extended state, as well as their association with the tire beads.

In the interior of the tire blank, the molding ring parts 7 are moved radially outwardly; at the same time, or subsequent thereto, the molding rings 6 are moved apart in the axial direction until the axailly outer and radially inner projections or shoulders 12 of the radial parts 7 have surmounted the tire beads 3 (open with a time of heating, FIG. 2).

Figure 3:
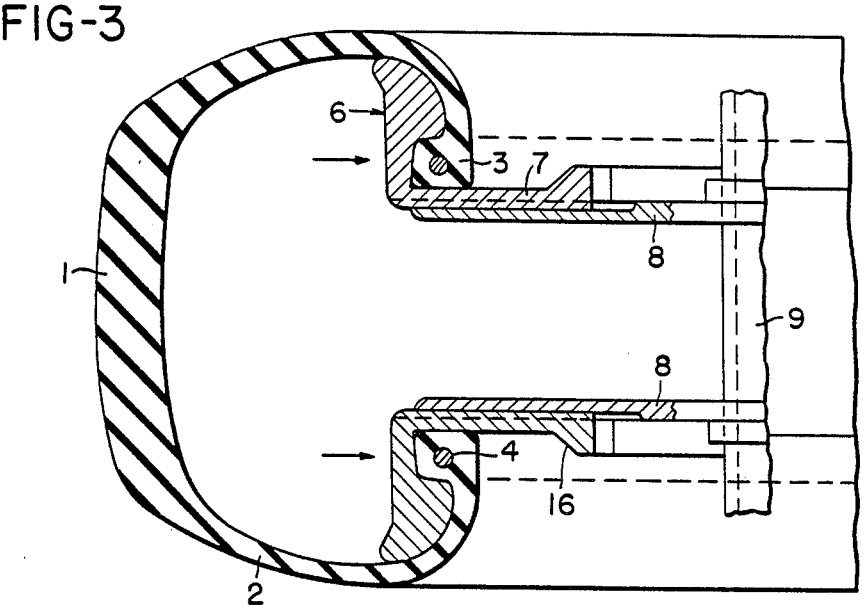
FIG. 3 is a view showing a partial radial section showing the pair of molding rings in the radially retracted and axially extended state (the vulcanization position), and further shows a tire blank, the beads of which are fixed in this position.

The radial parts 7 are subsequently again retracted to the smallest diameter of the molding rings 6 (FIG. 3), and are locked in this position with the aid of known means. If desired, a mounting mechanism similar to that described in U.S. patent application No. 653,493 Huinink et al, filed Sept. 21, 1984, now U.S. Pat. No. 4,610,288-Huinink et al dated Sept. 9, 1986 and belonging to the assignee of the present invention, can be used to facilitate the forming process, i.e. to improve the seating of the tire blank on the bead-molding rings 6. The method steps described up to this point are preferably performed outside the vulcanizing mold, since in this way a more favorable space situation exists for the displacement mechanism and its drive and control elements. After the tire blank, along with the molding rings 6, have been detached from the displacement mechanism, for example by being withdrawn at right angles therefrom, they are introduced and position in an open vulcanizing mode with the aid of a known loading mechanism, such as a swivel arm that is provided with a gripper.

Figure 4:
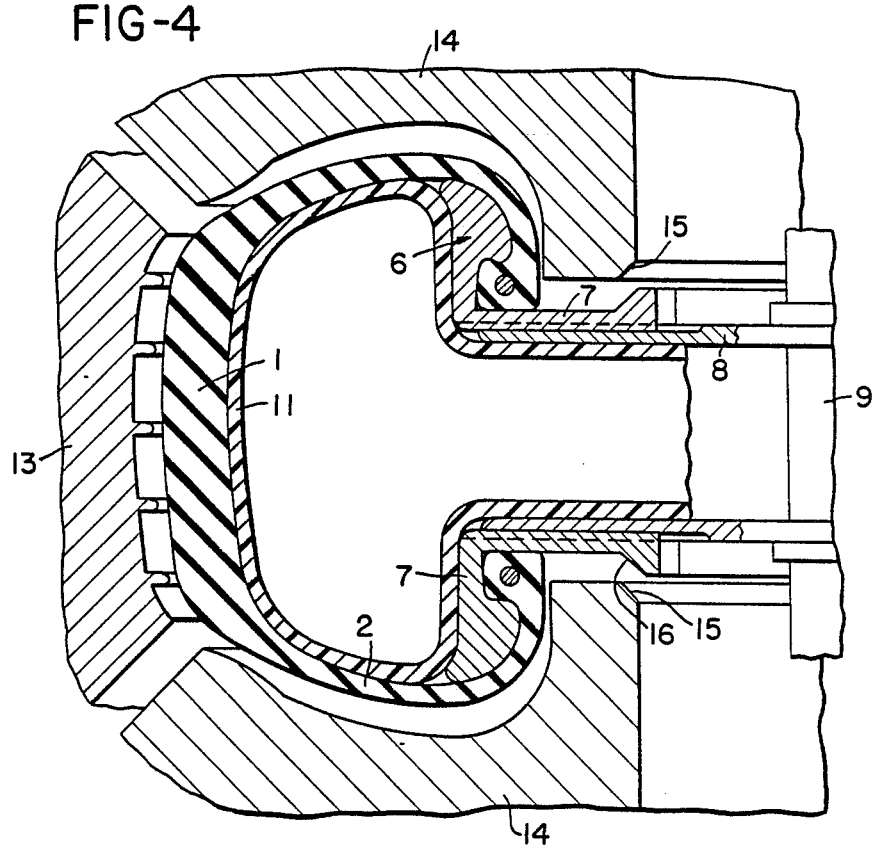
FIG. 4 is a view showing a partial radial section through a vulcanizing mold into which the tire blank has been placed.

As shown in FIG. 4, the vulcanizing mold is provided in a customary manner with radially movable sections 13 that are distributed over the periphery of the tire; axially movable side sections 14 adjoin the sections 13. It is particularly advantageous to provide the side sections 14 with centering surfaces 15 which, when the vulcanizing mold is closed, contact associated guide surfaces 16 on the molding rings 6, thus effecting a precise centering of the tire blank. As a rule, the vulcanizing mold also contains an expandable bellows-like bag 11 that is supplied with a heating medium. During the vulcanization process, the bag 11 presses the tire blank against the radial sections 13 and the side sections 14 of the vulcanizing mold. However, it is also possible to vulcanize without a bag 11. Subsequent to the vulcanization, the tire is removed from the mold in a reverse sequence.

If necessary, the molding rings 6, of course, also can be made of a metal other than steel, or can even be made of a heat-compatible synthetic material.

The present invention is, of course, in no way restricted to the specific disclosure of the specification and drawings, but also encompasses any modifications within the scope of the appended claims.

What we claim is:

1. A method of vulcanizing pneumatic vehicle tires in a mold for vulcanizing the tires when the mold is closed, the mold being provided with radially movable sections distributed over the periphery of the tire as well as adjoining axially movable side sections and where the tire beads, in the mounted state, are disposed on the radially inner periphery of a rim next to the essentially radially inwardly extending rim flanges having a final bead seating surfacing therewith; said method comprising the steps of:

providing two, respectively radially segmented, bead-forming rings that have molding-surface portions and that have a variable diameter and can be displaced axially as to location thereof in the mold including the radially movable sections and the axially movable side sections;

for the purpose of vulcanizing the sealing surfaces disposed in the interior of a tire so that these surfaces will rest on a rim in an airtight manner, introducing said bead-forming rings, in a radially retracted state, into the interior of a tire blank;

radially extending the segments of said forming rings to an annular diameter whereby the molding-surface portions of said forming rings can be moved axially outwardly over said tire beads without deforming the latter;

moving said molding-surface portions of said forming rings axially outwardly over said tire beads;

vulcanizing said tire blank in a vulcanizing mold so that the resulting tire essentially has the proper driving contour including a closed surface formed smoothly corresponding to final bead seating surfacing.

2. A method according to claim 1, which includes the step of centering said bead-forming rings during said vulcanizing step.

3. A method according to claim 1, which includes the steps of carrying out said step of introducing said forming rings into said tire blank externally of said vulcanizing mold, and subsequently placing said tire blank together with said forming rings into said vulcanizing mold.

4. A method according to claim 1, which includes the step of providing two pairs of said molding rings, with one pair being used for the vulcanization of a given tire blank while the other pair is introduced into another tire blank for its subsequent vulcanization.

* * * * *